United States Patent [19]

Nicosia

[11] Patent Number: 5,657,576

[45] Date of Patent: Aug. 19, 1997

[54] INSECT CONTROL APPARATUS AND METHOD

[75] Inventor: James Nicosia, 5 Railroad Ave., No. Reading, Mass. 01864

[73] Assignees: James Nicosia, No. Reading; Nicholas Reinhardt, Lexington, both of Mass.

[21] Appl. No.: 557,707

[22] Filed: Nov. 13, 1995

[51] Int. Cl.$^6$ ............................................. A01M 1/20
[52] U.S. Cl. ........................ 43/132.1; 43/112; 43/107
[58] Field of Search ..................... 43/107, 112, 114, 43/121, 122, 132.1

[56] References Cited

U.S. PATENT DOCUMENTS

| | | | |
|---|---|---|---|
| 3,796,001 | 3/1974 | Jackson | 43/113 |
| 3,891,962 | 6/1975 | White | 43/107 |
| 4,086,720 | 5/1978 | Wiser | 43/113 |
| 4,168,591 | 9/1979 | Shaw | 43/114 |
| 4,493,161 | 1/1985 | Soloway et al. | 43/107 |
| 4,852,296 | 8/1989 | Swanson et al. | 43/112 |
| 4,905,406 | 3/1990 | Warner | 43/107 |
| 4,907,366 | 3/1990 | Balfour | 43/132.1 |
| 5,205,064 | 4/1993 | Nolen | 43/112 |
| 5,205,065 | 4/1993 | Wilson et al. | 43/107 |
| 5,241,778 | 9/1993 | Price | 43/132.1 |
| 5,258,176 | 11/1993 | Keenan | 424/84 |
| 5,274,949 | 1/1994 | Beaton | 43/122 |
| 5,339,564 | 8/1994 | Wilson et al. | 43/107 |

FOREIGN PATENT DOCUMENTS

| | | |
|---|---|---|
| 1059823 | 9/1990 | China . |
| 3225412 | 12/1984 | Germany . |
| 66789 | 8/1988 | Switzerland . |
| WO16818 | 11/1991 | WIPO . |

Primary Examiner—Joseph J. Hail, III
Assistant Examiner—Darren Ark
Attorney, Agent, or Firm—Kenway & Crowley

[57] ABSTRACT

A method and apparatus for attracting insects, especially black flies and mosquitoes, in which the physical effects associated with the skin areas of prey-animals are simulated. Basic elements of the apparatus include warmed elastic-walled holders of pulsed fluid which may be in the form of elastic tubing through which warm fluid flows in pulses arranged to produce various physical effects associated with the underlying vasculature. Power for fluid heating and pulsing action may be provided by solar electrical, mechanical, nuclear, chemical or other source. Killing of insects or collection of live or dead insects may be accomplished by trapping or execution electrically, mechanically, or chemically.

8 Claims, 2 Drawing Sheets

INSECT CONTROL APPARATUS AND METHOD

BACKGROUND OF THE INVENTION

This invention relates in general to the control of insects, and in particular to the attracting of harmful insects such as mosquitoes, black flies and the like for purposes of monitoring, capturing, or killing them.

The need for insect control is well established and is probably best exemplified by the history of mosquito control. In the 19th-century Dr. Donald Ross of the British Army in India proved that malaria is spread by mosquitoes. At the turn of the century, the work of Dr. Walter Reed on controlling yellow fever during construction of the Panama Canal became famous. Since that time, despite intensive efforts by public health authorities everywhere, elimination of malaria and other mosquito-borne diseases has not been possible, largely because of the difficulty of eliminating mosquitoes. Now the world is faced with frightening outbreaks of incurable or newly drug-resistant mosquito-borne diseases, underlining the need for effective mosquito control measures, including means to capture, monitor, or destroy active adult individual specimens.

It is not only in the suppression of disease that controls are needed. There is the perennial call for abatement of the nuisance of mosquito and black fly bites, which make unprotected outdoor activities all but impossible at certain seasons of the year in many parts of the world.

Since mosquitoes and biting flies appear in vast numbers over wide areas, and readily evade any physical means of killing them, hunting them down individually or collecting them by simple mechanical means is not practical. With regard to mosquitoes, currently effective methods of control can only attack the population as a whole by chemical or bacterial means, or seek to remove their breeding sites. These methods are cumbersome, labor-intensive, and often politically disruptive, in that they may introduce dangerous amounts of toxic chemicals into the environment, kill harmless or beneficial creatures and destroy wetlands. At best they are only palliative in nature.

Some attempts have been made to isolate and refine the elements serving to attract various animals, including insects, in order to construct traps. In particular, for trapping mosquitoes, light, color-contrast, warmth, carbon dioxide, octenol, water vapor, lactic acid, and several more complex organic chemicals have been used as attractants.

Thus, traps exist, but traps currently in use require maintenance and resupply of consumables, and can be inhumane where live animals or persons are used as bait. Worse, they do not work very well. Certain traps are useful for monitoring mosquito populations and trapping live individuals for scientific purposes such as making virus assays, but the presently available traps, being usable only at certain times of days or seasons of the year, and then only on certain species of mosquito, are not themselves suitable for control purposes. Some of the control methods and traps in current use have the further disadvantage of killing large numbers of harmless and beneficial insects with resulting damage to the food chain.

In addition to the large-scale control measures in which attractant-based traps are legitimately used for guidance and monitoring, there has been no shortage of consumer bug control devices promoted for killing or repelling mosquitoes. These include bug "zappers", scented candles, floor washes, yellow light bulbs, vacuum and suction mechanical devices, electronic sound generators, wingbeat buzzers, etc. All these items are not really effective in practical terms, but continue to be sold on the unfulfilled promise that they will accomplish some good. Some, such as blue-light bug "zappers" kill hundreds of harmless or beneficial insects for every mosquito killed, and hence may actually do harm.

Unlike prior art devices, the present invention provides a solution useful in large-scale and research operations for disease control as well as in domestic and personal areas in the form of an inexpensive and effective device to concentrate and gather up mosquitoes and black flies for purposes of study, capture, nuisance-abatement, or extermination. In comparative trials, it has been shown to be capable of attracting multiple species of mosquito at rates at least an order of magnitude better than standard traps, with only minimal hazard to harmless and beneficial insects.

SUMMARY OF THE PRESENT INVENTION

The present invention is organized about the concept of simulating simple physical effects produced and transmitted by the skin of living animals. These effects, similar to others used throughout the animal kingdom for detecting the presence, location, animation, and state of mind of potential prey, mates, rivals, or predators, variously engender in animals receiving them the qualities and behaviors of arousal, pacification, attraction, or repulsion. With our invention, in the specific case of mosquitoes and black flies, it is possible to induce motion toward the source of the effects, or "attraction", followed by approach and landing of the insects within a predetermined area where they may more readily be dealt with.

The present invention is essentially an effective means for utilizing certain heretofore unappreciated attractive qualities of the skin of a live target as perceived by mosquitoes, black flies, and other biting insects. This invention has been found capable of attracting them from many meters away in numbers sufficient to be useful for control purposes, via a roughly accurate simulation of the physical effects appearing at the surface of the skin of a living prey animal. These effects may be a consequence of the slight motions, vibrations, and heat variations produced by the circulatory system, including the musculature, and viscera beneath the skin of prey animals. These motions and variations are readily detected by the insects as part of their repertoire of prey-finding capabilities. A simulator of the temporally and spatially patterned and unpatterned changes in physical position, and the roughly corresponding patterned, unpatterned, and changing temperatures of the skin surface encountered in a living animal, has been found to make a peculiarly effective attractant for mosquitoes and black flies, thus making it possible to build the equivalent of live-animal-baited mosquito-traps of any reasonable size, for use in research, nuisance abatement, and disease control applications.

The method and apparatus of the present invention involves providing one or more outputs capable of re-creating the positional and thermal "signature" of the skin of a living animal, as such skin is influenced (primarily) by the pulsing or flow of blood in the dermal and subdermal (i.e. interior) vasculature, and (secondarily) by small motions and heat developed by the musculature or viscera. As one possible embodiment, there has been provided a deliberately optimized and augmented fluid mechanical and thermal apparatus for simulating the physical effects of living skin that attract mosquitoes and black flies. It is presented here as a hybrid thermal/mechanical/electrical apparatus, but as can readily be appreciated, it can be constructed as an equivalent all-mechanical or all-electrical apparatus. In particular, the invention attracts, and induces to arrive and land within a predetermined area, certain flying, biting insects, such as mosquitoes and black flies, thereby producing a desired local concentration and spatial arrangement of the individuals for purposes of study, counting, sequestration, immobilization, harvesting, or killing. It does this by presenting the positional and thermal "signatures" characteristically produced by the skin of live prey animals in such a way that flying insects are able to detect them and then become motivated to make their way toward the apparatus, and further, to land and attempt to bite it. They will do this even if the apparatus is covered by a heavy cloth.

By "positional signature" is meant the slight displacement of the skin surface due to the activities beneath, which may include localized pulsing or throbbing due to blood pressure waves propagated throughout the circulatory system by the heart, more general movements due to voluntary or involuntary motions of the muscles or viscera, and vibration due to the generation of infrasonic, sonic, and ultrasonic acoustic energy by the systolic and diastolic (pulsed) flow of blood through the vasculature. Some of these skin displacements are area-wide; others are localized to the immediate vicinity of the underlying blood vessels: similar outputs that present the detailed temporal and spatial displacement of the skin including the differential movements of localized portions thereof (i.e., in patterns thereon) are believed to contribute greatly to the positional signature's appeal to mosquitoes and black flies and enhance the overall attractive effect.

By "thermal signature" is meant both the generally-elevated skin temperature relative to ambient of warm-blooded (or active cold-blooded) animals, and the localized spatial and temporal variations thereof. The generally-elevated temperature part of the "thermal signature" is related to a generalized heating "body heat" due to voluntary and involuntary activities of the underlying muscles and viscera; the localized spatial and temporal variations thereof are due primarily to the pulsing or flow of blood in the underlying veins, capillaries, and arteries. As with the positional signature, outputs that present both the fine static and dynamic temporal and spatial distribution (patterns) of heat flux (due to temperature distribution changes and/or geometrical/positional changes), as well as the gross static or slowly changing temperature differences between the skin area and the surroundings), contribute greatly to the thermal signature's detectability by mosquitoes and black flies, and likewise enhance overall attractive effect. When an attractor supplying these signatures is in use, the individual insects can be seen to approach in a characteristic "splayed-out" or "open" flying configuration, and to respond to details of the underlying pattern during approach and specifically to align themselves with features corresponding to sub-surface blood vessels when positioning themselves to bite.

Also, in dealing with such sensitive creatures as mosquitoes and black flies, it is extremely important to suppress (or to refrain from generating) extraneous signals not characteristic of the positional and thermal signatures of prey-animal skin, such as mechanical pump noise, motor whine, cooling-fan air turbulence, transformer hum, electrical or magnetic field disturbances and the like. An unfortunate co-generation of such signals can significantly diminish or even negate the attractive effect.

On the other hand, if auxiliary attractants, such as those known to prior art, are mixed appropriately with the output signatures of this invention, the attractive effect can be enhanced still further. Such enhancements are mere refinements, and are not an essential feature of this invention.

Broadly, the present invention is embodied in a deliberate recreation and optimization of the signature-creating elements of prey-animals which attract insects, particularly biting insects such as mosquitoes and black flies. This is achieved by imitating certain mechanical properties and spatial arrangements of the skin as well as selected elements of the coarse and fine detail of the underlying vasculature. Fluid-mechanical apparatus powered electrically or otherwise is used here to simulate action of the skin and circulatory system, including the spatial, mechanical and thermal effects produced by its vascularization. This apparatus may then be combined with a system for disposing of attracted insects Such as a collector trap or an electrified grid killing means. It is to be understood that this action and these effects can be produced by straight mechanical, straight electrical, or hybrid systems as well.

BRIEF DESCRIPTION OF DRAWING

For a better understanding of the present invention, together with other and further objects, features and advantages, reference should be made to the following description of a preferred embodiment which should be read in conjunction with the appended drawing in which.

DESCRIPTION OF PREFERRED EMBODIMENT

Figure 1:
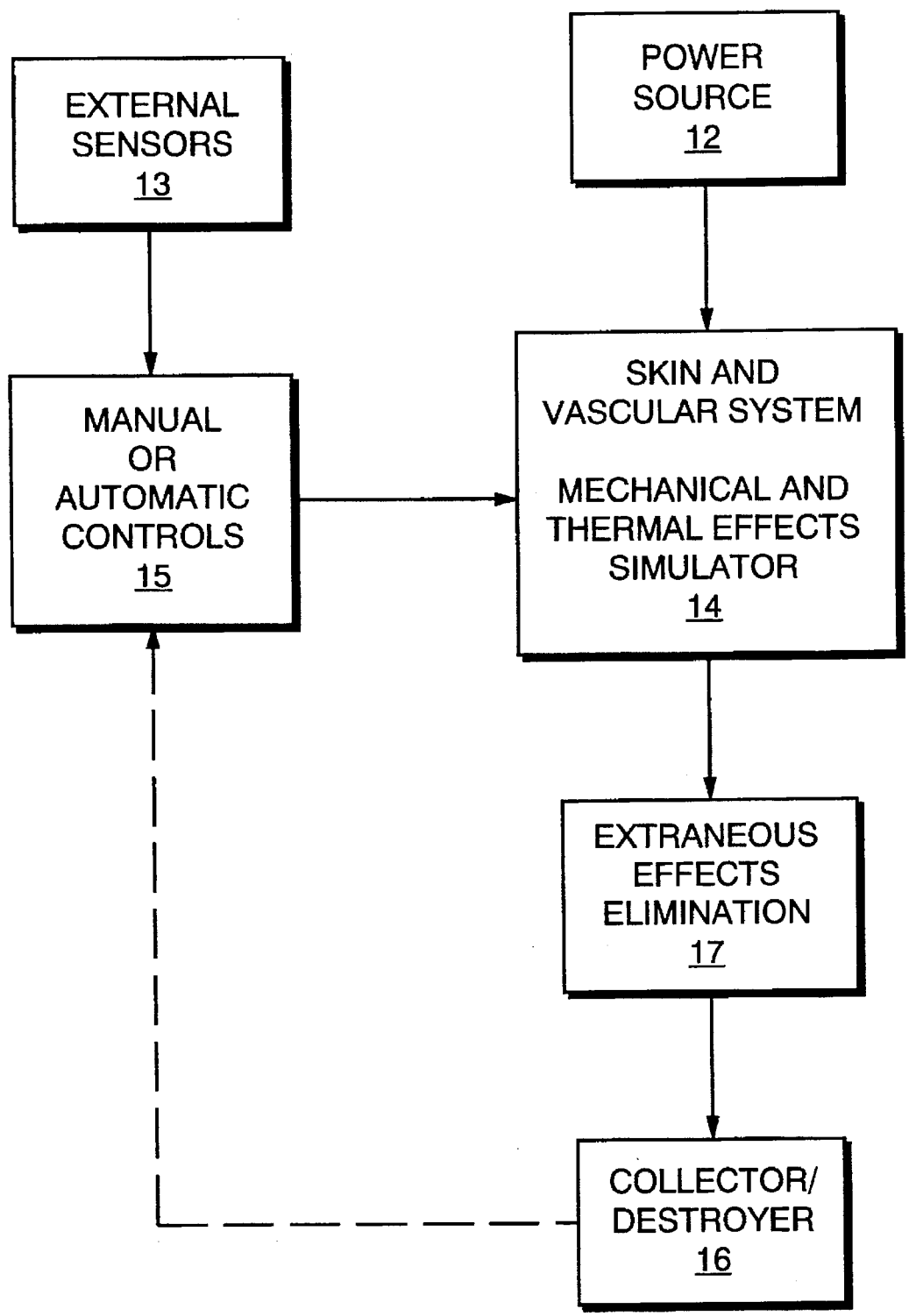
FIG. 1 is a block diagram of basic elements of the invention.

In FIG. 1, a simplified system is outlined. It includes a power source 12 which may be no more than a conventional outlet in more highly developed areas or may be as primitive as a bicycle-powered generator in undeveloped areas. In isolated areas, the power source may indeed preferably be solar or thermal depending upon availability in the area where the apparatus is to be used.

Connected to the power source 12 is a key element of the invention, namely, the simulator or reproducer 14 of physical effects associated with animal skin and detectable by insects to be attracted.

Depending upon the function being served by the apparatus, the element 16 may be a collector or a destroyer into which insects attracted by the simulator 14 are drawn under their own power of locomotion, or they may be forced there by any convenient means such as air flow, a mechanical sweep, or similar device located within a trap area into which the mosquitoes or black flies have been attracted.

It may at times be useful to have self-regulation of the device. To that end, information from timers or ambient condition sensors 13 and feedback information from the collector/destroyer 16 can be provided through the control 15 to the simulator 14.

In some situations, in addition to periodic shutdown of sources of noise such as those which might be generated by the simulator 14, it has proven desirable to include sound insulation, filter or other extraneous eliminators of possibly disabling sounds. Such a device 17 is shown in FIG. 1 disposed for convenience between the simulator 14 and the killer-collector 16.

Figure 2:
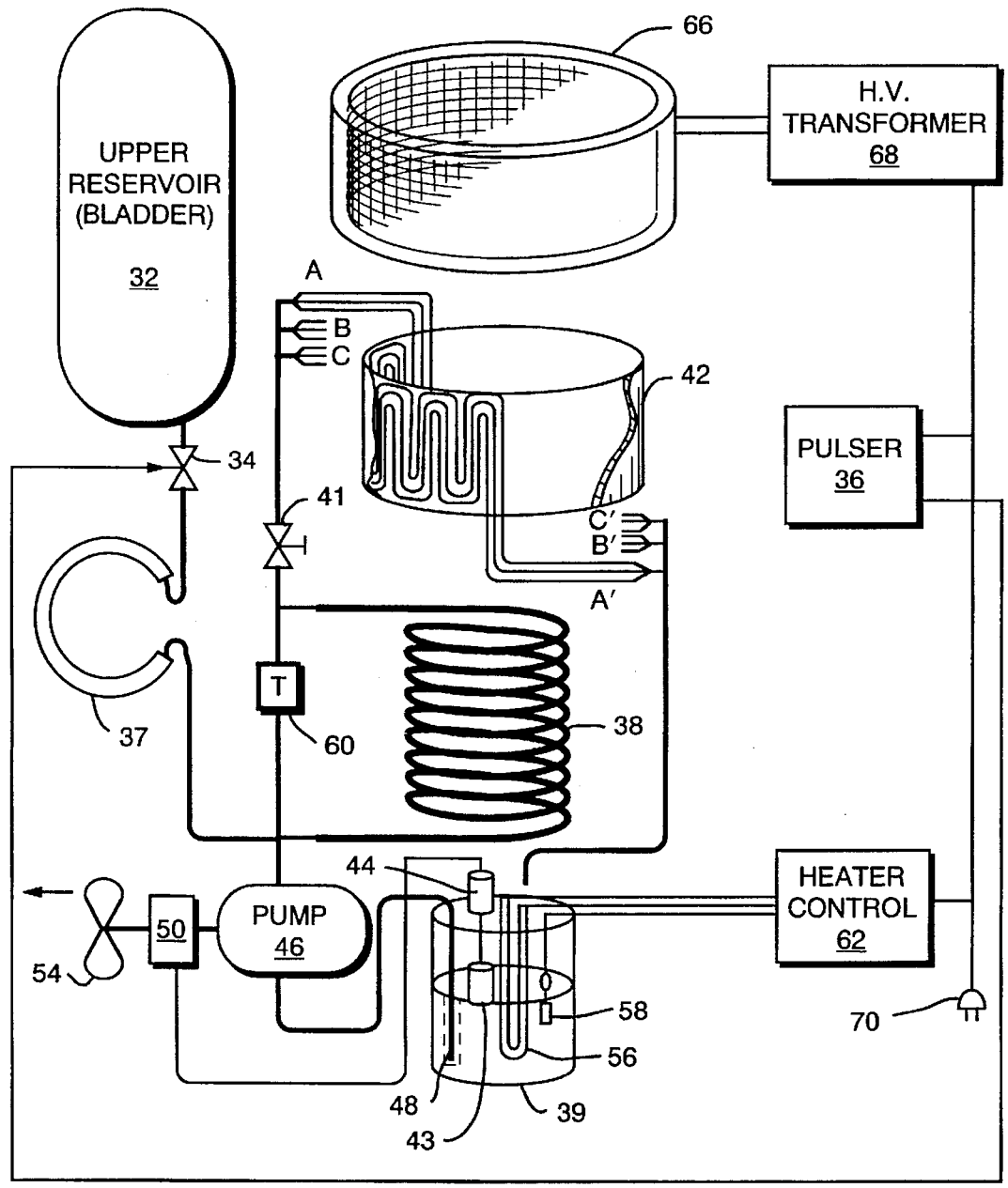
FIG. 2 is an idealized exploded view of one embodiment of the present invention.

FIG. 2 is an idealized exploded view of one embodiment of the present invention. There may be seen a supply reservoir 32 which may be a rubber bladder which contains a quantity of warm water. The supply reservoir 32 may be filled by a pump initially, but for extraneous signal suppression reasons it is considered desirable to discontinue pumping operation during the several minutes of time it takes to empty the reservoir 32 through the device during operation. A pulse valve 34 is connected to the outlet of the reservoir 32 and it is controlled in its operation by a pulse valve control 36. The pulse valve control 36 is programmed to open the valve 34 periodically, preferably at a rate comparable to that of an animal heartbeat, allowing the water to flow intermittently. Such an intermittent flow produces pressure waves due to both the static pressure head provided by the bladder 32, and the dynamic (ram) pressures developed when the water flow is interrupted by the pulse valve 34. In this fashion, pulses of warm water supplied to a simulated vascular system give rise to thermal and positional effects characteristic of the skin of an animal. The vascular system may consist of a throbber coil 37 which is formed of highly elastic, thin-wall, low-durometer, flexible tubing. The throbber coil 37 may actually consist of one or more free-standing loops of ¼" O.D. pure-latex surgical rubber tubing which tend to move spasmodically with the flow and interruption of water pulses. The tubing continues and is formed into a simulated arterial section composed of a number of turns of tubing 38. For convenience, these turns of tubing 38 may be wound on a water-tight cylindrical container 39. A parallel array 40 of finer flexible plastic or rubber tubes of about 5/64" O.D. made to simulate capillaries is connected in parallel with the arteries 38. There is no need to simulate the actual branching and subdivision typical of the arteries in an animal vascular system. The important thing is to provide a finely detailed signature pattern superimposed on that of the "arterial" flow. The arteries 38 are wound about the cylindrical container 39 and a larger cylindrical sleeve 42 made of hardware cloth of about ½" mesh may be set up about the arteries. The capillaries then are wound in a pattern through the mesh of the cylindrical sleeve 42 of hardware cloth, which winding may then be covered by a membrane, Turkish towelling, or a loudspeaker grill cloth, or left exposed. Pulses of warm water flow from the pulse valve 34, thence through the throbber 37 and through both the arteries and the capillaries to be discharged into the cylindrical container 39. A flow-restricting valve 41 serves to provide sufficient back pressure to ensure that the tubing physically distends during pulsing. Such distension is very important.

The cylindrical container 39 may be equipped with a water level control, including a float 43, a float switch 44, and a pump 46. An intake 48 may be provided for the pump and it is preferably disposed in a filter placed deep within the cylindrical container 39. The pump 46 may be driven by a motor 50 which also serves to drive a fan 54. The fan 54 cools the motor and may serve to disperse water vapor rising from the open-topped container 39 which may also serve to enhance the attractive function of the apparatus. A heater 56 and a temperature probe 58 are also disposed in the cylindrical container 39. As spent and cooled water accumulates in the container 39, the water is reheated by the heater 56 and is pumped back to the artery-capillary system through a check valve 60. Operation of the pump 46 and maintenance of proper water temperature is assured by a heater control 62 which is adjustable manually or by auxiliary timing and ambient-sensing controls. A killing grid 66 may be disposed concentrically about the simulated vascular system and it may be energized by means of a high-voltage transformer 68.

Power for the pulser 36, the pump motor 50, the heater 56 and the high-voltage transformer 68 may be provided by a conventional or other source 70.

The vascular system of the invention may take various forms. It is preferably an elastic-walled subdivided system consisting variously of "arteries", "capillaries", and "veins" of different diameters and spacings roughly imitative of systems found in natural warm-blooded prey animals. These may be disposed beneath a membrane imitative of the outer skin surface of an animal, hidden behind a cloth grille, embedded in the elastic wall of a container or simply left standing bare and alone. It is believed that adequate attraction of insects occurs with a single size of tubes but an array of varying sizes, spacings and elasticities give rise to a spatial frequency "signature" which the insects rely upon to some degree for near-field attraction and prey-seeking orientation. Experience indicates that insects are definitely affected by the individual detailed elements of the "signature" when they are positioning themselves just before biting. Such signature details may be produced by a physical arrangement of the flexible "blood vessels" or even by covering a thin flat pulsating diaphragm with a perforated or slotted mask. Simulation of the detailed thermal and mechanical effects associated with natural living-animal skin is the desideratum. These effects include slight periodic differential movement from some slower-moving or static average position, a slightly elevated static or slow-moving average temperature, and a finely detailed pattern of differential temperatures and temperature changes.

Similarly, the pulsed flow of warm fluid in the vascular system is designed to be similar to the flow of blood produced naturally by a beating heart. Such effects are associated with a periodic surge of fluid which normally is warm relative to ambient temperature through a system which may include periodic dilation of the vessels. This action changes the volume, area, and ability of the vessels to emit heat; it changes their position relative to each other and to the incoming mosquito; it also causes them to emit vibrations such as sound and infrasound, possibly detectable by the insects. The results of such action may be transmitted directly by the vessels themselves, or they may be mediated by an overlying skin. For example, it is known that they can be perceived by the insects through a heavy cloth loudspeaker grille cover.

Throbbing of the vessels as exhibited by the free-standing loop of artery tubing which moves under Bourdon-tube forces which tend to straighten the loop out at each pressure pulse. A number of subtle effects may be caused by the throbbing and squirming of the imitation blood vessels, any one or combination of which may be detectable by the biting insects. These include the dimensional, positional, and thermal changes described above, which themselves may give rise to thermal and acoustical emanations detectable by the insects, or alternatively, they may influence or modulate acoustic and thermal emanations issuing from the insects themselves, which influences or modulations are then detected by the insects.

The degree of attraction exhibited by devices built in accordance with principles of the present invention varies depending upon structural design. Even the supply reservoir 32, which is elastic-walled, filled with fluid and subject to some pulsing movement will attract some insects. Greater attraction is exhibited by the throbber coil 37 and the greatest attraction is had with the simulated artery-capillary vascular system through which warm fluid flows in pulses. Obviously, the warm fluids could be replaced by cold fluid, compressed air, or a mechanical or electromechanical actuator and heat could be supplied by radiation, or conduction from a separate source, or generated directly by passage of electrical current.

Accordingly, the invention should not be limited to the details of the embodiment described, but only by the spirit and scope of the appended claims.

What is claimed is:

1. A method of attracting insects which includes the steps of passing fluid which is warm relative to ambient temperature through an elastic-walled container in pulses.

2. A method as defined in claim 1 wherein said elastic-walled container is spasmodically movable in response to pressure and flow of said fluid in pulses.

3. A method as defined in claim 1 wherein said container comprises at least in part loops of elastic-walled tubing mounted to permit their periodic distension, dilation or movement in response to said flow of fluid in pulses.

4. A method as defined in claim 1 wherein said elastic-walled container comprises at least in part turns of relatively large tubing connected to turns of relative small tubing to simulate a portion of arteries and capillaries through which said fluid flows in pulses.

5. A method as defined in claim 4 wherein said turns of tubing are disposed beneath a membrane which simulates the outer skin of live animals.

6. In a device for controlling insects which prey upon animals which produce predetermined physical effects, the combination of a simulator of said physical effects for attracting said insects which includes an elastic-walled container, means for passing fluid intermittently through said container, and means for disposing of said attracted insects.

7. In a device as defined in claim 6, the combination in which said elastic-walled container includes at least in part loops of free-standing tubing.

8. Apparatus for the control of biting insects comprising a source of power, a simulator of physical effects occurring at the skin of prey animals for attracting said biting insects and means for disposing of attracted insects, said simulator including elastic-walled containers of fluid, means actuated by said source of power for warming and moving said fluid intermittently through said containers, and means for disposing of said insects including an insect-killing system also actuated by said source of power.

* * * * *